May 2, 1950  J. S. SHOCKEY  2,505,995
SPECTACLE ENDPIECE
Filed March 17, 1947
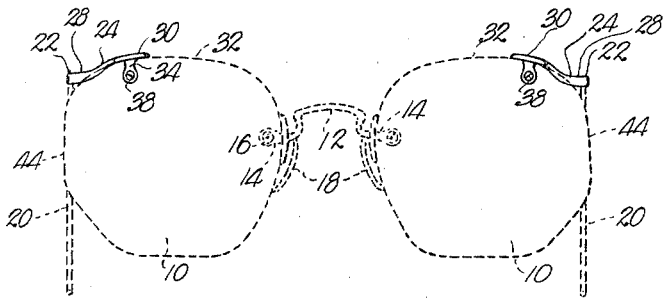
Fig. 1.
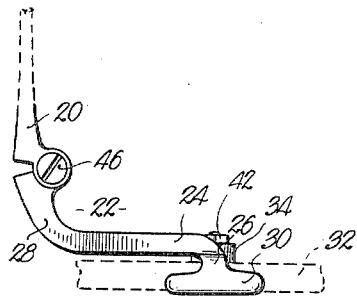
Fig. 2.
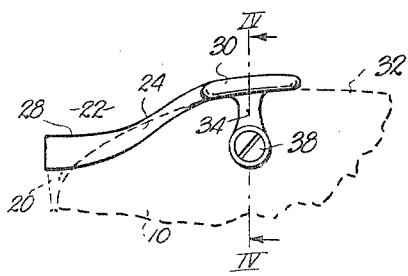
Fig. 3.
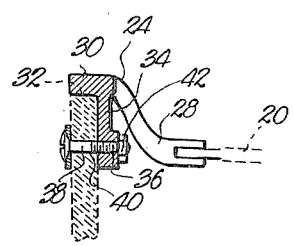
Fig. 4.
Inventor
Joseph S. Shockey
By
Attorney Patented May 2, 1950

2,505,995

UNITED STATES PATENT OFFICE 2,505,995

SPECTACLE ENDPIECE

Joseph S. Shockey, Kansas City, Mo.

Application March 17, 1947, Serial No. 735,132

1 Claim. (Cl. 88—53)

This invention relates to spectacles and particularly to an end piece for interconnecting the lenses thereof and the temple bow that is entirely separable from association with the spectacles and, therefore, may be manufactured and sold as a separate article of manufacture for replacements and when such part has become worn or damaged beyond further use.

The most important object of this invention is to provide a spectacle end piece formed by a substantially L-shaped bar having means on one leg thereof for joining the same to the lens and means of interconnection on the free end of the other leg thereof with the temple bow.

Another important object of this invention is to provide a spectacle end piece having a bar provided with an ear contoured to overlap and tightly engage the uppermost edge of the spectacle lens and a downwardly projecting ear serving as a means to attach the end piece to said lens, all to the end that the same is rendered adaptable for use with virtually any type of lens and may be adjusted with respect to such lenses whereby to vary the distance between the temple bows and thereby accommodate wearers having varying distances between their temples.

A further object of this invention is to provide structure that is relatively strong, easily and inexpensively manufactured and which, when assembled with conventional types of spectacles lenses decreases breakage thereof to a minimum.

The precise form of spectacle end piece is clearly illustrated in the accompanying drawing, wherein:

Fig. 1 is an elevational view of a pair of spectacles having the end piece thereon made in accordance with my present invention.

Fig. 2 is a top plan view thereof taken on an enlarged scale.

Fig. 3 is an enlarged plan view of the end piece showing the same associated with a temple bow and a portion of the lens, and Fig. 4 is a cross sectional view taken on line IV—IV of Fig. 3, looking in the direction of the arrows.

Fig. 1 illustrates a pair of spectacles of the well known character which includes a pair of lenses 10 and an interconnecting nose piece. This nose piece comprises a bridge 12, having ears 14 for joining the same to lenses 10 by medium of screws or the like 16 and a pair of nose pads 18.

The end piece per se for joining the lenses 10 to the temple bow 20 is broadly designated by the numeral 22. This end piece 22 comprises a substantially L-shaped bar having legs 24 and 26 respectively and a curved portion 28, forming a free end of the leg 24. The leg 26 of bar 22 is substantially T-shaped as is clear in Fig. 2, to present a shoe 30. In other words, leg 26 is disposed in overlapping relation with the uppermost edge 32 of lens 10 and terminates in the arcuate shoe 30 so contoured as to conform to the curvature of uppermost edge 32 of lens 10. When in operative position, this shoe 30 is in tight engagement with edge 32 of lens 10. This leg 26 of bar 22 has integral therewith a downwardly projecting ear 34. The lowermost free end of ear 34 terminates in spaced relation with respect to the uppermost edge 32 of lens 10 and has a bore 36 therethrough for receiving a bolt 38. This bolt 38 is first threaded through an opening 40 in the lens 10 and has a nut 42 in threaded engagement therewith. The end of leg 26 remote from shoe 30 extends a distance rearwardly from the innermost face of lens 10 and merges with leg 24 of bar 22 in spaced relation to lens 10. Bar 24 extends laterally outwardly from the point of connection between ear 34 and lens 10 to a point near the outermost edge 44 of lens 10. It is notable that this extending portion of leg 24 is in spaced relation to the innermost face of lens 10, as clearly illustrated in Fig. 2. The curved portion 28 of leg 24 extends rearwardly from lens 10 and has on its free end one section of this hinge 46, which cooperates with the other portion of a hinge 46, forming a part of the temple bow 20 to join bar 28 with temple bow 20.

It is notable that the end piece just described constitutes a single molded piece, which includes the legs 24 and 26, the curved portion 28, the shoe 30 and the ear 34. The precise contour thereof, particularly the curved shoe 30, permits drilling the opening 40 in the lenses 10 at virtually any position thereon to the end that the distance between the temple bows 20 may be varied to accommodate different wearers.

It is also a notable feature of this end piece 22 that ear 34 extends far enough downwardly from edge 32 of lenses 10 to lessen accidental breakage because of the weakened condition due to the provision of opening 40 in lenses 10. Furthermore, shoe 30 and ear 34 lies flatly against the edge 32 and the innermost face of lenses 10 respectively as shown in Fig. 4, thereby adding rigidity to the spectacles.

Many advantages will arise through use of the spectacle end piece above described and it is understood that such advantages are contemplated hereby. It is, therefore, desired to be limited only by the spirit of the invention and scope of the appended claim.

Having thus described the invention, what is claimed as new and desired to be secured by Letters Patent is:

In spectacles having a lens and a temple bow; a unitary end piece interconnecting the lens and the temple comprising an elongated bar having a laterally projecting leg on each end respectively thereof, said legs extending oppositely; an elongated shoe on the outermost end of one of said legs in overlying engagement with a portion of the uppermost edge of said lens, the longitudinal axes of the bar and the shoe being substantially parallel; an ear depending from said one leg between the bar and the shoe and having means for attaching the same to the inner face of said lens, said bar extending outwardly along said edge of the lens in spaced relationship to the lens with the other leg thereof terminating inwardly from the outermost edge of the lens and extending outwardly from said face of the lens, said bar being inclined downwardly from said one leg thereof and as the other leg of the bar is approached, said one leg and said shoe being in a common plane parallel with a plane through the other leg of the bar; and means on the free end of said other leg for pivotally receiving one end of the temple bow, said bar, said legs, said shoe and said ear all being integral, the pivotal axis of the temple bow being perpendicular to said planes.

JOSEPH S. SHOCKEY.

REFERENCES CITED

The following references are of record in the file of this patent:

UNITED STATES PATENTS

| Number | Name | Date |
|---|---|---|
| 1,843,496 | Schwab | Feb. 2, 1932 |
| 1,964,664 | Emons | June 26, 1934 |
| 2,014,978 | Pappert | Sept. 17, 1935 |
| 2,180,820 | Gaspari | Nov. 21, 1939 |
| 2,238,556 | Durgin | Apr. 15, 1941 |
| 2,292,399 | Nerney | Aug. 11, 1942 |
| 2,355,053 | Carlson | Aug. 8, 1944 |
| 2,359,666 | Nerney | Oct. 3, 1946 |